US012171712B2

(12) United States Patent
Kappl et al.

(10) Patent No.: US 12,171,712 B2
(45) Date of Patent: Dec. 24, 2024

(54) ROLLING WALKING DEVICE

(71) Applicants: Simon Kappl, Rosenheim (DE); Theresa Hauser, Reit im Winkl (DE); Sebastian Griesser, Schechen (DE); Nikolaus Wittko, Schechen (DE)

(72) Inventors: Simon Kappl, Rosenheim (DE); Theresa Hauser, Reit im Winkl (DE); Sebastian Griesser, Schechen (DE); Nikolaus Wittko, Schechen (DE); Uwe Nowak, Schechen (DE)

(73) Assignee: Conixus Patentverwaltungs Ug, Schechen (DE)

( * ) Notice: Subject to any disclaimer, the term of this patent is extended or adjusted under 35 U.S.C. 154(b) by 855 days.

(21) Appl. No.: 17/261,220

(22) PCT Filed: Jul. 23, 2019

(86) PCT No.: PCT/EP2019/069771
§ 371 (c)(1),
(2) Date: Jan. 19, 2021

(87) PCT Pub. No.: WO2020/020872
PCT Pub. Date: Jan. 30, 2020

(65) Prior Publication Data

US 2021/0267838 A1 Sep. 2, 2021

(30) Foreign Application Priority Data

Jul. 24, 2018 (DE) ..................... 10 2018 212 291.1

(51) Int. Cl.
*A61H 3/04* (2006.01)

(52) U.S. Cl.
CPC ......... *A61H 3/04* (2013.01); *A61H 2003/046* (2013.01); *A61H 2201/0161* (2013.01);
(Continued)

(58) Field of Classification Search
CPC .............. A61H 3/04; A61H 2201/1621; A61H 2003/043; B62K 5/023
See application file for complete search history.

(56) References Cited

U.S. PATENT DOCUMENTS 3,165,314 A * 1/1965 Clearman ................ A61H 3/04
5/81.1 R
4,798,395 A * 1/1989 Shaffer .................... B62M 1/14
280/282
(Continued)

FOREIGN PATENT DOCUMENTS

DE 2004765 A1 8/1971
DE 202007004607 U1 7/2007
(Continued)

OTHER PUBLICATIONS

International Partial Search Report for International Application No. PCT/EP2019/069771, dated Sep. 3, 2019, 13 pgs.
(Continued)

*Primary Examiner* — Noah Chandler Hawk
(74) *Attorney, Agent, or Firm* — Kowert, Hood, Munyon, Rankin & Goetzel, P.C.; Jeffrey C. Hood; Luke Langsjoen

(57) ABSTRACT

A rolling walking device for a person with a disability includes a plurality of rollers and at least one support apparatus for the person. The at least one support apparatus is configured so that the person while using the rolling walking device can sit on the at least one support apparatus and simultaneously rest with a front side of their upper body at least partially on the at least one support apparatus with their hip joint flexed.

17 Claims, 9 Drawing Sheets

(52) U.S. Cl.
CPC ................ *A61H 2201/0192* (2013.01); *A61H 2201/1633* (2013.01); *A61H 2201/1635* (2013.01); *A61H 2203/0425* (2013.01); *A61H 2205/088* (2013.01)

(56) References Cited

U.S. PATENT DOCUMENTS

| | | | | |
|---|---|---|---|---|
| 5,467,793 | A | 11/1995 | Hart | |
| 5,732,964 | A * | 3/1998 | Durham | B62K 3/16 482/68 |
| 6,036,210 | A * | 3/2000 | Lee | B62K 5/023 280/282 |
| 7,150,722 | B1 | 12/2006 | Tyrrell | |
| 7,422,550 | B1 | 9/2008 | Pinero et al. | |
| 7,900,940 | B1 * | 3/2011 | Vidmar | A61H 3/008 280/271 |
| 9,433,552 | B2 * | 9/2016 | Chang | A61G 5/04 |
| 9,962,312 | B2 * | 5/2018 | Heinrich | A61H 3/04 |
| 2001/0045227 | A1 * | 11/2001 | Balan | A61H 3/04 135/67 |
| 2006/0254631 | A1 | 11/2006 | Mullholand | |
| 2011/0232708 | A1 * | 9/2011 | Kemp | A61H 3/04 135/67 |
| 2017/0189258 | A1 | 7/2017 | Ott et al. | |
| 2017/0273854 | A1 | 9/2017 | Yu | |
| 2022/0212752 | A1 * | 7/2022 | Hunter | B62K 1/00 |

FOREIGN PATENT DOCUMENTS

| | | | |
|---|---|---|---|
| DE | 202007008267 | U1 | 8/2007 |
| DE | 202014101231 | U1 | 3/2014 |
| DE | 202015106424 | U1 | 3/2017 |
| DE | 202016004678 | A1 | 7/2017 |
| DE | 102017102066 | A1 | 9/2017 |
| DE | 202017102137 | U1 | 7/2018 |
| EP | 2233120 | B1 | 8/2015 |
| FR | 2745714 | A1 | 9/1997 |
| FR | 2959663 | A1 | 11/2011 |
| FR | 3027514 | A1 | 4/2016 |
| GB | 2231500 | A | 11/1990 |
| JP | 2016039857 | A | 3/2016 |
| WO | 2014001853 | A1 | 1/2014 |

OTHER PUBLICATIONS

International Search Report for International Application No. PCT/EP2019/069771, dated Oct. 30, 2019, 18 pgs.

* cited by examiner

ROLLING WALKING DEVICE

1. TECHNICAL FIELD

The present invention relates to rolling walking devices for patients with a disability.

2. STATE OF THE ART

Walking aids are used for support and therapy of congenital, disease-, accident-, and/or age-related disorders of the human musculoskeletal system. In particular, rolling walking aids are known that allow a patient to be assisted in walking and/or to train the patient's walking ability and/or to at least partially treat the patient's symptoms.

However, some of the known walking aids require the patient to be fixed to the respective walking aid in order to use the walking aid. As a result, the respective patient is dependent on another usually trained person to assist him in getting into the walking aid. Further, fixing the patient to the walking aid and/or adjusting the walking aid to the patient can be complicated and time-consuming.

Furthermore, the walking aids known from the prior art are only insufficiently suitable for the support and/or therapy of patients with a disability of the musculoskeletal system in the area of the hip joint, since they require that the patient uses the walking aid in an essentially upright body posture. In particular, the above-mentioned fixation of the patient to the respective walking aid can result in the patient being forced into an unnatural and/or uncomfortable or even painful body posture, which is usually not conducive to achieving the therapy goal.

In particular, the walking aids known from the prior art are not suitable for patients in whom a disorder of the musculoskeletal system does not permit an essentially upright body posture with a hip joint that is not flexed or only slightly flexed, or only under pain. For example, walking devices known in the prior art are often unsuitable for patients with fixed contractures at the trunk and/or at the extremities, which is often associated with global muscular insufficiency or central movement disorder.

In addition, the known walking aids only insufficiently enable the patient's equilibrioception or rather balance to be trained while walking. Finally, the known walking aids are often unsuitable for moving over uneven surfaces. Even small obstacles, such as doorsteps, are usually insurmountable for the patient during movement due to the small size of the rollers used.

The present invention is therefore based on the task of developing novel walking devices that are easy to construct and to handle and yet can improve the support and/or therapy of patients with a musculoskeletal disability, overcoming at least in part the disadvantages of the prior art discussed above.

3. SUMMARY OF THE INVENTION

This task may be solved by the subject matter of the independent claims of the present invention. Exemplary embodiments are described in the dependent claims.

In one embodiment, an apparatus may comprise a rolling walking device for a person with a disability, wherein the walking device has: a plurality of rollers, at least one support apparatus for the person, wherein the at least one support apparatus is configured so that the person using the rolling walking device can sit on the at least one support apparatus while simultaneously resting with a front side of their upper body at least partially on the at least one support apparatus, optionally also while flexing their hip joint.

Such an arrangement may allow patients with walking disabilities whose mobility is impaired in the area of the hip joint, for example due to a hip flexion contracture, to use the rolling walking device as a walking aid and/or therapy device while leaving the hip joint in a flexed position. In particular, the muscles involved in walking and their coordination may be trained in this way, even in patients who have no or only limited ability to maintain an upright body posture. Patients with a hip extensor muscle strength value according to Janda greater than or equal to 3 may be able use the walking device according to the invention independently. For patients with a hip extensor muscle strength value according to Janda less than 3, support by an assistant or electrical residual strength support may be required.

For example, the invention may allow for assisting and/or treating patients who have any of the following disorders of the musculoskeletal system:

a. a misalignment of the spine such as a scoliosis;
b. a hip flexion contracture;
c. an insufficiency of the hip muscles;
d. multiple contractures;
e. a global misalignment of the skeleton and/or skeletal muscles;
f. a spastic dystonic/dyskinetic movement disorder;
g. a fixed contracture of the lower extremities, possibly in connection with a contracture of the upper extremities;
h. an incomplete paraplegia;
i. a flaccid paresis;
j. unilateral/bilateral spastic cerebral paresis;
k. an incomplete paraplegia in a meningomyelocele.

Furthermore, such an arrangement may allow the user to have improved access to various workplaces. Since the user sits on the walking aid and does not push it in front of him or her, the user can move closer to any obstacles such as furniture and/or even partly drive under them. This greatly extends the user's radius of action both inside and outside rooms.

In particular, such an arrangement may also allow patients to use the walking aid according to the invention for whom the use of crutches or rollators may not be possible due to limitations of the upper extremities.

The at least one support apparatus may comprise a seat and at least one upper body support that are adjustable relative to each other.

This may allow the walking device to be adapted to the body size and/or body posture and/or a misalignment of the skeletal muscles of a patient. In particular, such adjustability of the at least one support apparatus may allow the walking device, over a longer period of time, to adapt to the patient's body posture which may steadily improve as the success of therapy progresses.

Further, this may allow some patients who do not have to be restrained to the walking device and may be able to enter the walking device independently or alternatively require only minor assistance from an untrained or trained person to do so.

Additionally, or alternatively, the at least one support apparatus may be designed to be at least partially plastically deformable. This may also allow the at least one support apparatus and thus the walking device to be adapted to an improved and/or changed posture of the patient as a result of using the walking device. Additionally, the support apparatus may thereby be individually adapted to an asymmetrical body posture of the patient.

Another advantage of such an adjustable and/or deformable support apparatus may be that a single walking device can be customized individually for ambulant therapy of multiple patients with different body sizes and/or body postures.

In particular, the at least one support apparatus may be configured to allow the hip joint of the person using the rolling walking device to flex at an angle between 0° and 90°, preferably between 0° and 30°, relative to an upright body position.

In another embodiment, an apparatus may comprise a rolling walking device for a person with a disability, wherein the walking device may comprise: a plurality of rollers, at least one support apparatus for the person, and at least one joint which is configured so that the at least one support apparatus is able to tilt laterally relative to a base surface on which the rolling walking device rolls.

Such a tiltable construction of the support apparatus may lead, for example, to the patient using the walking device being prompted to actively stabilize the support apparatus against tilting. This may cause the patient to adopt a dynamic walking behavior, thereby constantly training the muscles that support walking—in particular the hip muscles, gluteal muscles and adjacent trunk and back muscles—as well as the patient's coordination skills and equilibrioception. Especially in combination with a forward displacement of the upper body, which may be able to be brought about with the aid of the support apparatus, the tiltable construction of the support apparatus may have a positive effect on triggering the walking reflex.

Further, the rolling walking device may have an adjustment apparatus that enables the lateral tilting of the at least one support apparatus to be influenced. In particular, the adjustment apparatus may be configured to influence the lateral tilting in a first tilting direction differently than in an opposite direction of the first tilting direction.

For example, this embodiment may allow the tilting, and thus the dynamic walking behavior that the walking device may cause the patient to perform, to be individually adapted to the severity of the respective disorder of the patient's musculoskeletal system. In particular, the tilting may be adjusted asymmetrically such that the at least one support apparatus may be tilted differently in one direction than in the opposite direction.

Further, the adjustment apparatus may provide a restoring torque against lateral tilting of the at least one support apparatus, wherein the restoring torque may be preferably adjustable. Thereby, in some embodiments, the adjustment apparatus may be configured such that the restoring torque is substantially proportional to the tilting of the at least one support apparatus. This may be achieved, for example, by a spring mechanism which provides the restoring torque for the at least one tiltable support apparatus.

For example, such restoring torque may improve the walking device in that it may support dynamic walking and thus training of the patient's hip and gluteal muscles, as well as adjacent trunk and back muscles. In particular, an adjustment apparatus designed in such a manner may allow a lower restoring torque to act on small tilts that are easily compensated for by the patient than on large tilts that are more difficult to compensate for by the patient.

Further, the restoring torque may be independently adjustable for two tilting directions, for example, to adapt the restoring torque to any asymmetric disturbance of the patient's musculoskeletal system.

Alternatively, or additionally, the walking device may have a limiting apparatus with which the lateral tilting of the at least one support apparatus can be limited, wherein the limiting apparatus may preferably be configured adjustable.

Such a limiting apparatus allow not only the restoring torque but also a maximum possible tilting to be individually adapted to the respective patient.

Further, the limiting apparatus may be configured to be adjustable for two tilting directions independently of each other, for example, in order to individually adapt the maximum possible tilting to an eventual asymmetric disturbance of the patient's musculoskeletal system that may be present.

In another embodiment, an apparatus may comprise a rolling walking device for a person with a disability, wherein the walking device may comprise: a plurality of rollers arranged on a frame element, wherein the frame element is connected to at least one roller via a fastener which is arranged below a rotational axis of the at least one roller.

In one embodiment, the fastener may be disposed in the lower third and in another embodiment, the fastener may be disposed in the lower quarter of the at least one roller.

Such a construction may allow for use of rollers with a much larger diameter, for example, to improve the rolling characteristics of the walking device without compromising the stability of the walking device against lateral overturning.

In some embodiments, the fastener may be pivotally connected or moveably attached to the frame element.

For example, this may allow the fastener of the at least one roller to be configured such that the spatial orientation of the rotational axis of the at least one roller can rotate relative to the rest of the walking device in a large angular range, in particular 360°, which may allow for a very small turning radius.

Further, the fastener of the at least one roller may have a disk-shaped element that may not rotate about the rotational axis of the at least one roller and on which a tire-shaped element of the roller may be rotatably mounted or moveably attached. With such an arrangement, large rollers can be realized without loss of stability.

In some embodiments of the present invention, the walking device may comprise a planar frame element that provides a plurality of adjustable positions for a plurality of components of the walking device to be fastened to the frame element, respectively. In particular, the respective components of the walking device may be detachably fastened to the planar frame element. For example, for this purpose, the flat frame element may have two mounting surfaces between which the components of the walking device may each be adjustably attachable.

Such a construction may allow for the fastening points of the respective components to be individually adapted to the respective patient and additionally or alternatively for the rolling walking device to be quickly and easily disassembled and reassembled if necessary, for example for transport. In particular, this may allow the walking device to be transported in a car, if necessary even in addition to a wheelchair, whereby the user comfort is considerably improved and the frequency of use can be significantly increased. This may not be possible with many alternative walking devices due to the lack of disassemblability.

In some embodiments of the present invention, the planar frame element may comprise a plurality of holes defining the plurality of adjustable positions, wherein at least a portion of the plurality of holes may be arranged in a grid configuration that is preferably substantially triangular, equilateral triangular, or hexagonal.

Such a hole arrangement may make it possible, for example, to develop and manufacture new components and/or add-on parts for the walking device, which may also be attached to already manufactured walking devices, since the hole arrangement is already known. In particular, patient-specific components and/or add-on elements may also be developed, manufactured and attached to already manufactured walking devices in this way. For example, for patients with crossed gait due to increased tone of the hip adducting muscles, stripe blocks could be developed, manufactured and attached to already manufactured walking devices.

In some embodiments of the present invention, the walking device may comprise an adjustable push bar configured to be moved from a first position, in which it may follow the contour of a roller of the walking device, to a second position for pushing the walking device.

Such a push bar may allow the therapist or another person to assist the respective patient in using the walking device, for example when the walking device has to be moved over a doorstep or uphill. At a point in time when the push bar is no longer needed, it may be returned to the first position in which it disturbs the patient using the walking device as little as possible.

In some embodiments of the present invention, the walking device may comprise a brake at which a flexible traction element is arranged such that the brake can be actuated by an actuation of the flexible traction element.

Such an arrangement may allow for use of the brake as a grinding and/or parking brake when the traction element is kept under tension. Furthermore, such an arrangement may allow the brake to be actuated by pushing on and/or pulling on the traction element, which in turn may require less coordination from the user. This may be particularly advantageous for patients with insufficient fist grip and/or insufficient mobility of the fingers. In particular, the flexible traction element may also be designed as a flat textile or net to make it even easier for a patient to actuate the brake.

4. BRIEF DESCRIPTION OF THE FIGURES

Certain aspects of the present invention are described in the following with reference to the appended figures. These figures show:

FIG. 1 illustrates a side view of a rolling walking device according to some embodiments;

FIG. 1*a* illustrates a side view of a roller as mounted on the front axle, according to some embodiments;

FIG. 1*b* illustrates a schematic side view of a roller with adjustable axle fork tilting, as mounted on the front axle, according to some embodiments;

Figure 11A:
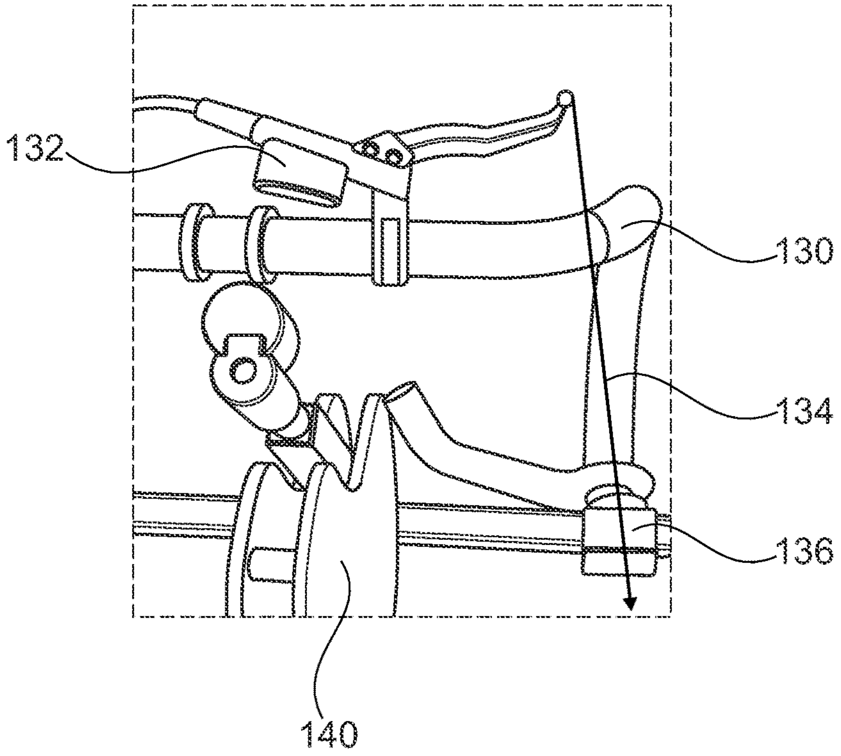
Figure 11B:
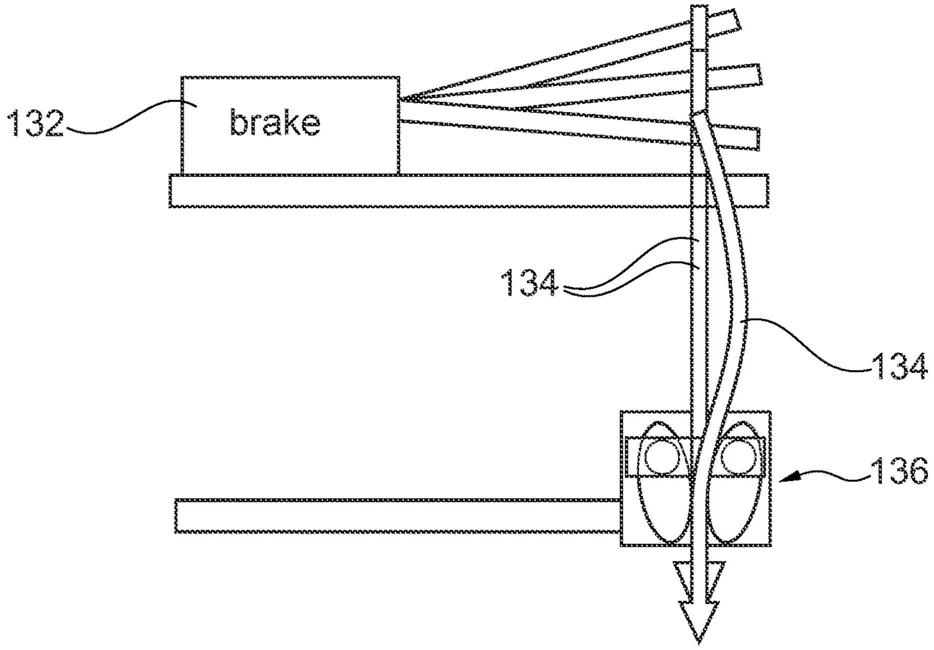

FIG. 11*a* illustrates a brake with a flexible traction element for actuation, according to some embodiments; and FIG. 11*b* illustrates a schematic drawing of a brake with a flexible traction element for actuation according to some embodiments.

5. DETAILED DESCRIPTION OF SOME EMBODIMENTS

In the following, some embodiments of a rolling walking device are described. Herein, various combinations of features are described with reference to some exemplary embodiments of the present invention. As an example, in the following, a three-wheeled rolling walking device with a large rear wheel and two smaller front wheels as well as a frame, a hand support, a seat and an upper body support is described. However, the claimed walking devices are not limited to such embodiments. Rather, it is to be understood that other combinations of features may also fall within the scope of protection of the invention. In other words, not all features of the described embodiments need to be present to implement the present invention. Furthermore, the embodiments may be modified by combining certain features of one embodiment with one or more features of another embodiment without departing from the disclosure and the scope of protection of the present invention.

In particular, the present invention is not limited to three-wheeled walking devices with a rear wheel, but can be applied to a plurality of different rolling walking devices for a person with a disability.

The terms roller and wheel are used equivalently in the context of the present invention. Further, in the context of the present invention, the term "substantially" is to be understood as "within typical design, construction, manufacturing and/or measurement tolerances".

Figure 1:
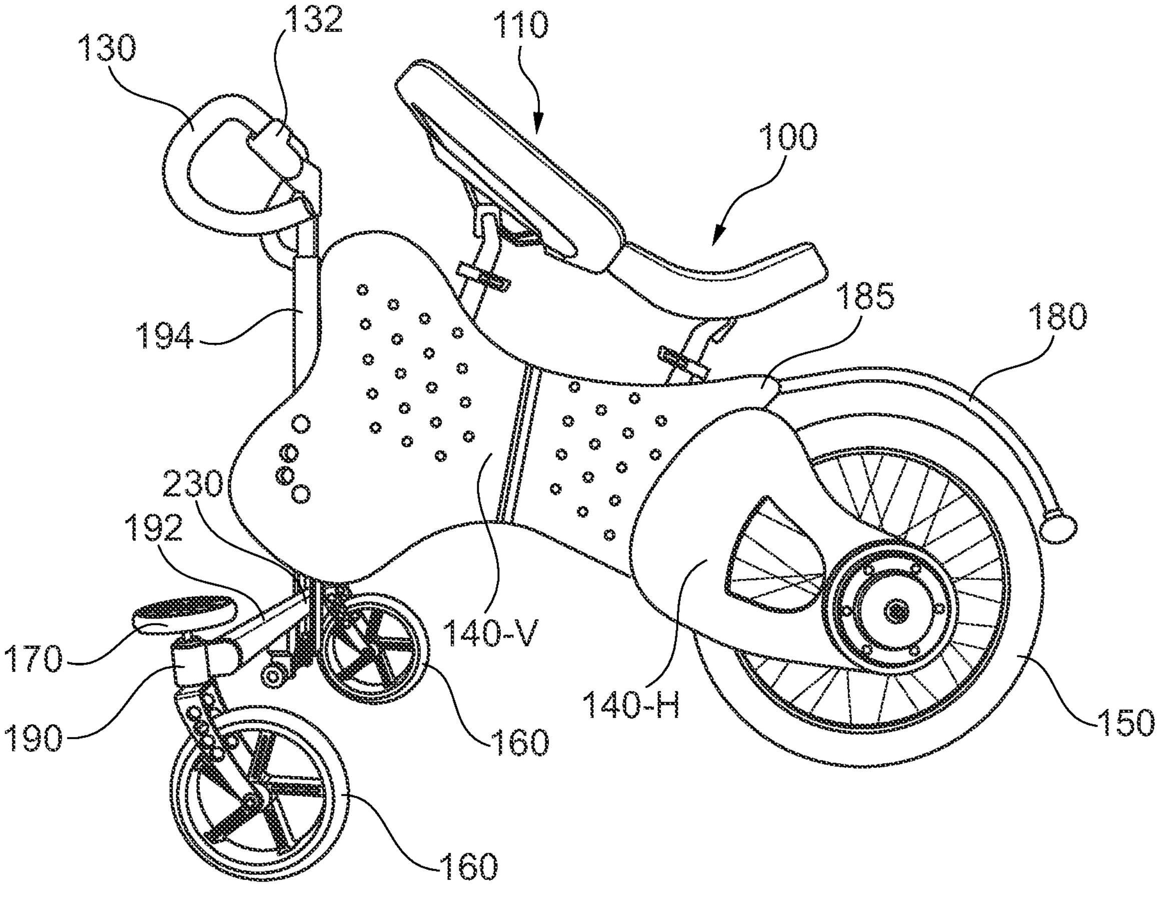

FIG. 1 illustrates a side view of a three-wheeled rolling walking device, according to some embodiments of the present invention. The walking device herein may have a seat 100 and an upper body support 110, which in the shown embodiment are detachably connected to the front portion 140-V of a frame independently of each other. However, in other embodiments, the seat 100 and the upper body support 110 may also be integrated into a common support apparatus and/or further support elements (not shown) for the upper body and/or other body parts of the patient may also be attached to the frame 140.

Further, both seat 100 and upper body support 110 of the embodiment shown in FIG. 1 may be configured to be adjustable in their height and/or position to each other. Likewise, as shown in more detail in FIGS. 6 and 7, it may also be possible to adjust the position of the respective fastening point of the seat 100 and the upper body support on the frame 140 of the walking device.

Singularly or in their combination, the above-described adjustment options of the support apparatus, which in this embodiment may be provided by the seat 100 and the upper body support 110, may allow for the support apparatus to be adapted to the patient's body posture and/or body size individually and readjustably as needed.

Figure 1A:
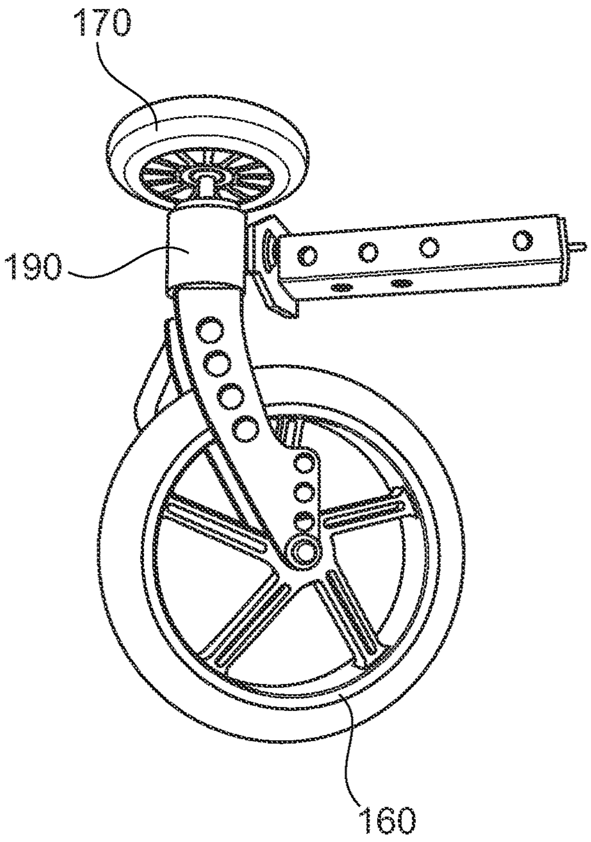
Figure 1B:
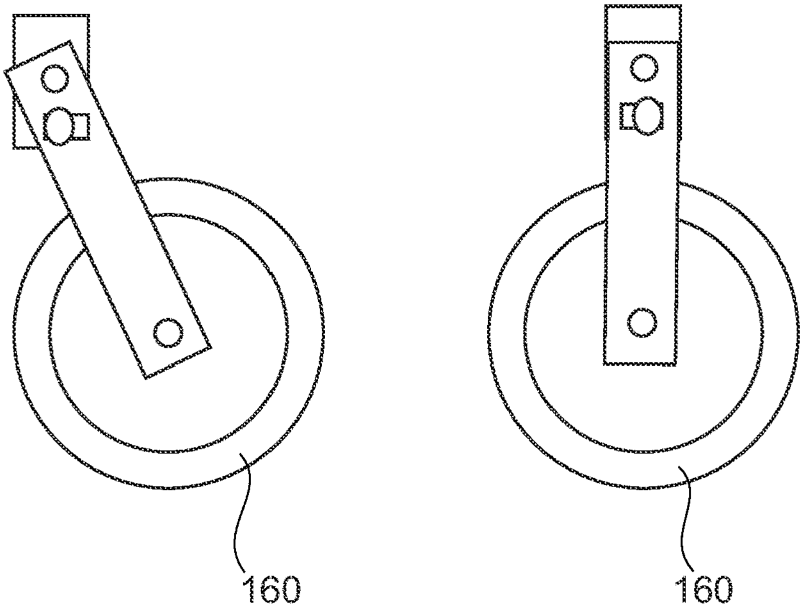

Further, the rolling walking device of FIG. 1 may include two eccentrically arranged front wheels 160 and a substantially centrally arranged rear wheel 150. The eccentrically arranged front wheels 160 may be pivotally connected or moveably attached to a wheel suspension 192 via pivot joints 190 (and to the frame 140 via the connecting bar) to stabilize the walking device and prevent it from overturning. The pivot joints 190 thereby may improve the steering ability of the walking device, thereby reducing the minimum curve radius or turning radius that the walking device can roll. In a preferred embodiment, the wheels 160 may be pivotably and detachably connected to the wheel suspension 192 via pivot joints 190, such that the track width of the axle can be individually adjusted, for example with the aid of a plug-in system, as can be seen in FIG. 1*a*. The detachable connection may also allow switching between different types of wheels, for example between smaller wheels for indoor use and larger wheels for uneven terrain, for example in outdoor areas. In a further preferred embodiment, illustrated in FIG. 1*b*, the wheels 160 may be each suspended in an axle fork, the tilting of which can be variably adjusted and each of which may be pivotably and possibly detachably connected to the wheel suspension 192 (cf. FIG. 1) via pivot joints 190 (cf. FIGS. 1 and 1*a*). The axle fork tilting can thus be adapted to the activity. If the axle fork is perpendicular to the ground, this may increase the maneuverability of the walking device. If the axle fork is tilted, the directional stability of the walking device may be increased.

In addition, the walking device of FIG. 1 may comprise a height-adjustable hand support 130 which may be connected to the front part 140-V of the frame at the front end via a connecting bar 194. In a preferred embodiment, the hand support 130 may have a multiple curved geometry, in the shape similar to a racing bicycle handlebar, for example. One such shape may allow for a wide variety of grip positions, so that patients who suffer from insufficient active and/or passive supination of at least one forearm may also use the walking device. Further, a variety of possible grip positions may subconsciously encourage the user to change grip position more frequently, thereby improving active hand use. As described in more detail in FIGS. 2-4, the connecting bar 194 may be connected to the wheel suspension 192 via a joint 230. The joint 230 thereby may allow the frame 140 and all components attached to it, and in particular the support apparatus formed by the seat 100 and upper body support 110, to tilt laterally relative to the base surface on which the walking device of FIG. 1 rolls. The wheel suspension 190 thereby may remain substantially in an orientation parallel to the base surface, thereby stabilizing the walking device against overturning. In other words, when the frame 140 is tilted, the angle between the connecting bar 194 and the wheel suspension 192 changes. In the rest position, this angle may be approximately 90°.

The substantially centrally arranged rear wheel 150 may be rotatably connected to the rear portion 140-H of the frame. In one embodiment, the rear portion 140-H of the frame may be detachably connected to the front portion 140-V of the frame. Thereby, the rear portion 140-H of the frame may be connected to the front portion 140-V of the frame in various positions, whereby the frame height and/or wheelbase of the walking device can be individually adjusted. Thereby, the rear wheel 150 may be eccentrically fastened to the rear portion 140-H of the frame, as described further below in connection with FIG. 9, to further adjust the frame height and/or wheelbase.

The rear part 140-H of the frame may be designed in the form of a single swing arm so that the rear wheel 150 is rotatably connected to the rear part 140-H of the frame on one side only. Alternatively, the rear part 140-H of the frame can also be in the form of a wheel fork to which the rear wheel 150 may be rotatably connected, e.g. by a quick-release axle.

In some embodiments, the rear wheel 150 may have a larger diameter than the front wheels 160. A larger diameter of the wheels 150, 160 of the walking device generally may improve the rolling characteristics of the walking device because, for example, a larger wheel can roll over obstacles such as a doorstep more easily than a smaller wheel. However, the diameter of the rear wheel 150 may be selected to be only as large that the entering of the patient into the walking device and the positioning of the patient's body on the seat 100 and upper body support 110 can be done over the rear wheel 150. In particular, the arrangement of the wheels 150, 160 of the seat 100 and the upper body support 110 shown in FIG. 1 may allow the patient to enter the walking device more easily and, in many cases, independently and without the assistance of another person. Further, in another embodiment, the diameter of the rear wheel 150 may be selected such that the rear wheel 150 provides enough space for a hub motor. Thereby, in the case of an electric hub motor, the required power source could be mounted, for example, below the hand support 130 on the frame 140.

In a further embodiment, instead of a rear wheel 150, an axle assembly comprising at least one wheel may be connected to the frame 140. In particular, this axle assembly may be similar in all or some aspects to the front axle assembly described. This embodiment may be useful for patients who are particularly susceptible to overturning, as it may increase the stability of the walking device. In some embodiments, the axle assembly may be detachably connected to the frame 140 so that it can be exchanged for other axle assemblies or a single rear wheel 150 as required by the patient.

Further, the walking device shown in FIG. 1 may comprise a foldable push bar 180 which is connected to the rear end of the front part 140-V of the frame via a swivel joint 185 and whose shape may be adapted to the round shape of the rear wheel 150. This may allow the push bar 180 to take up as little additional space as possible when folded in and not obstruct the patient when entering the walking device. In the unfolded state (see also FIG. 8), the push bar 180 may be used to assist the patient in using the walking device, such as when walking uphill or when passing an obstacle such as a doorstep. The push bar 180 may have more than two possible positions, to fold in particular in the folded state as close as possible to the rear wheel 150 depending on the position of the rear wheel axle relative to the frame 140.

Further, the walking device of FIG. 1 may comprise a brake 132 which is fastened to the hand support 130. The brake 132 may be thereby connected via a traction mechanism or a similar mechanism to a braking device (not shown), which is arranged on the rear wheel 150. The braking effect thereby preferably engages the rear wheel, as this can prevent the walking device from rolling over forward at any time. The brake 132 may be used as a drag brake during use of the walking device to reduce the speed of the walking device and/or increase the resistance of the rear wheel 150. In a further mode of operation, the brake 132 may also be used as a parking brake to prevent the walking device from rolling away undesirably—for example, downhill. A flexible traction element 134 (not shown) may further be arranged at the brake 132 (for details see FIGS. 11*a* and 11*b* below).

Further, at the outer ends of the wheel suspension 192 deflection rollers 170 may be provided which, when the walking device for example comes into contact with a wall, deflect it away from the wall and thereby prevent the walking device from becoming stuck on such a wall during use.

Finally, it is already apparent from FIG. 1 (for details see FIGS. 5-7 below) that at least the components 100, 110, 130, 180, 194 may be detachably fastened to the frame 140 and the walking device can thus be easily disassembled, for example for transport, or individual components can be easily replaced.

Figure 2:
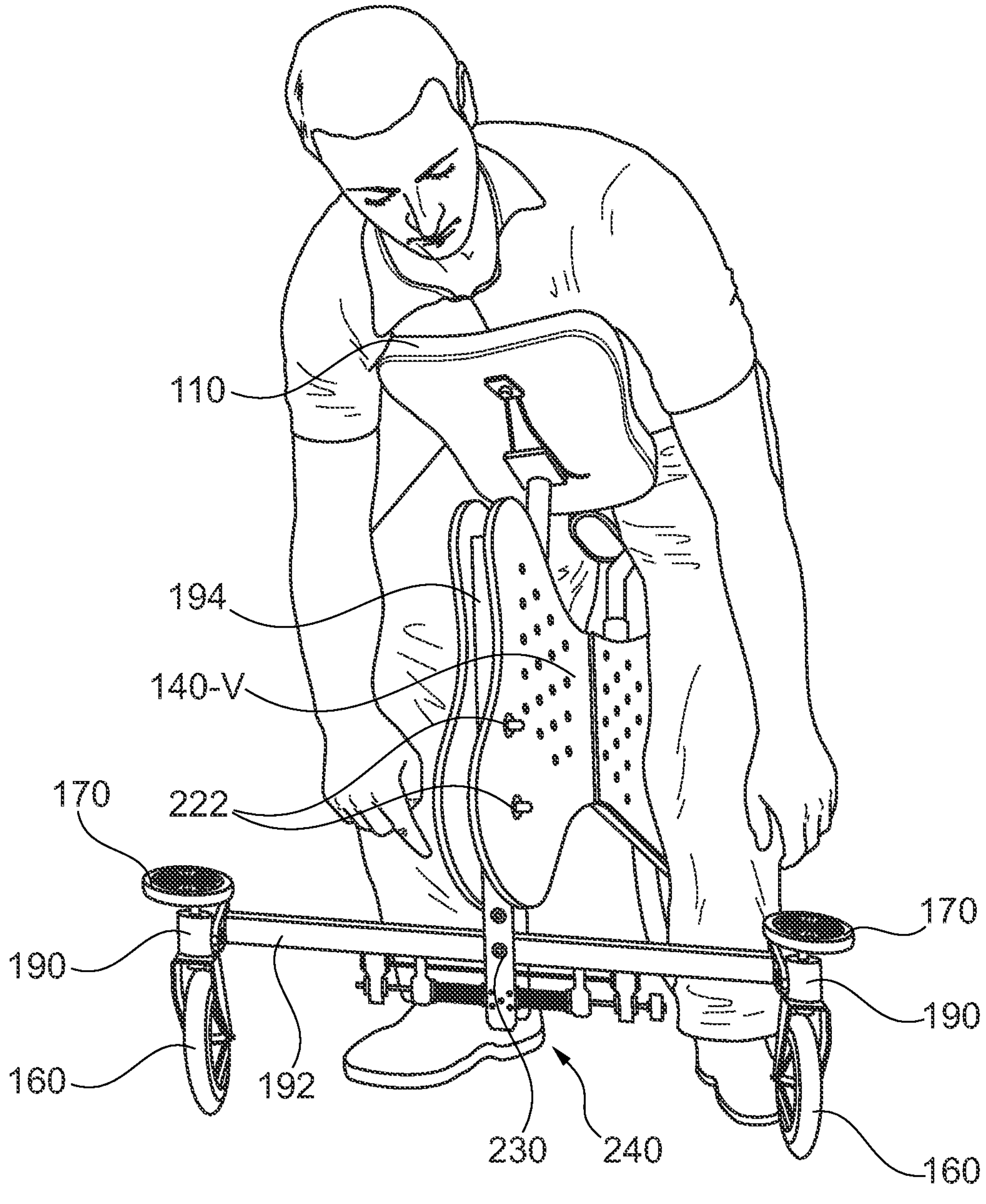
FIG. 2 illustrates a front view of a rolling walking during use, according to some embodiments.

FIG. 2 illustrates the walking device of FIG. 1 in use by a person, wherein the hand support 130 of FIG. 1 is not mounted for better illustration. FIG. 2 also illustrates a typical body posture of a patient using the walking device. As shown, the person sits on the seat 100 (hidden) and leans with the upper body at least partially against the upper body support 110. In this posture, the person's feet can touch the ground and the person can move the walking device by walking movements with the legs. The hip joint of the person may thereby remain in a flexed position. Thereby, the shown walking device enables patients with a disability in the area of the hip joint, such as a hip flexion contracture, to train walking.

In FIG. 2, it is also shown how the connecting bar 194 may be detachably connected at two fastening points 222 to a left fastening surface and a right fastening surface of the frame 140 by means of quick-release fasteners or screws. Likewise, it can be seen how the connecting bar 194 may be connected to the wheel suspension 192 via the joint 230 such that the frame 140 can be tilted laterally from the left side to the right side relative to a center position of the frame when the walking device is in use. For example, in FIG. 2, the frame 140 is tilted slightly to the right side relative to the center position. In this regard, an adjustment and/or limiting apparatus 240 described in more detail in FIGS. 3 and 4 may allow the frame 140 to tilt relative to the base surface on which the walking device rolls and relative to the orientation of the wheel suspension 192.

The tiltability of the walking device may cause the patient using the walking device to engage in dynamic walking behavior, since the patient must actively provide lateral stabilization of the frame 140. In particular, this may achieve a physiologically desirable walking behavior and, for example, may train not only the leg muscles but also the hip and gluteal muscles and the adjacent trunk and back muscles as well as their coordination. Furthermore, the balance and/or equilibrium of the patients may also be trained.

In some embodiments, the support apparatus formed from seat 100 and upper body support 110—and thus the body of the patient—can be tilted laterally relative to the base surface on which the walking device rolls. In other words, other embodiments of the invention also exist in which, for example, the frame 140 cannot be tilted laterally and/or such a frame as shown in FIGS. 1 and 2 need not to be present at all. For example, the frame 140 could be fixedly connected to the wheel suspension 192 and the support apparatus could be tiltably connected to the frame 140 via a joint.

Figure 3:
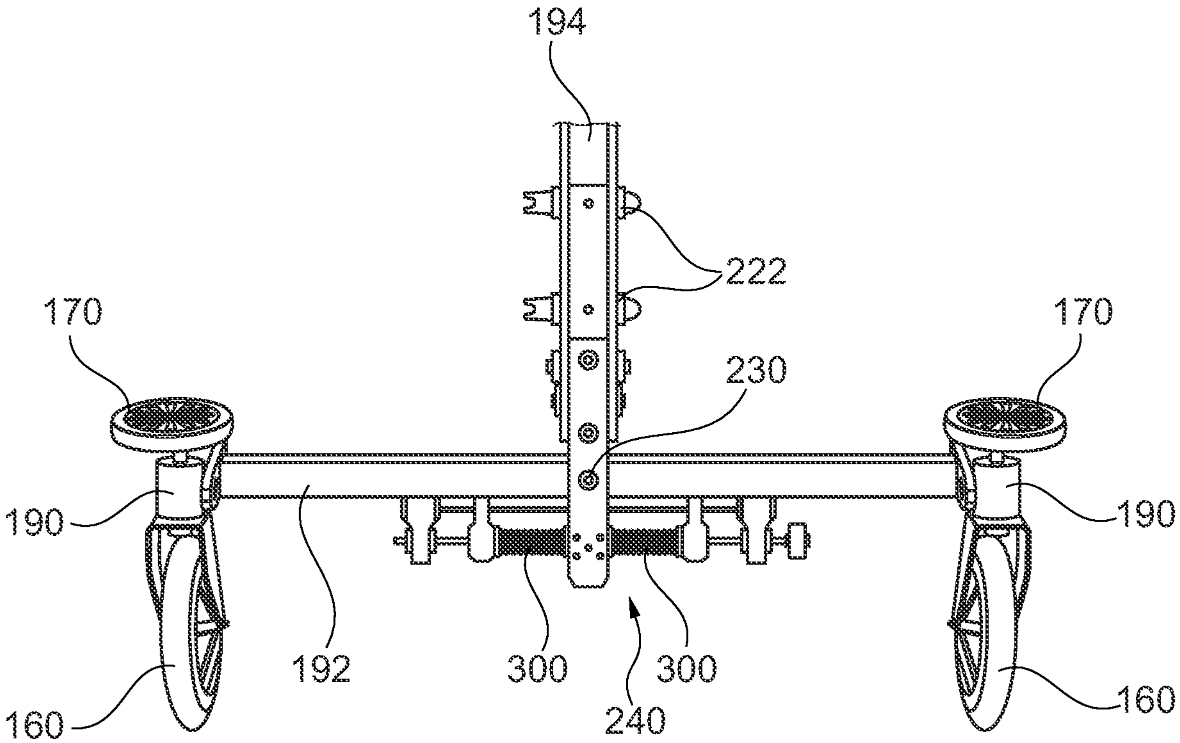
FIG. 3 illustrates a front view of the front axle and the frame of a rolling walking device, according to some embodiments.

FIG. 3 illustrates a front view of the front axle and the frame of a rolling walking device according to some embodiments. As described in the preceding figures, the connecting bar 194 may be connected to the frame 140 via two fastening points 222. The connecting bar 194 may be further connected to the wheel suspension 192 via a joint 230 laterally tiltable. The wheels 160 therefore may be pivotally connected to the wheel suspension 192 via pivot joints 190. In one embodiment, the wheels 160 may be pivotably and detachably connected to the wheel suspension 192 via pivot joints 190 so that the track width of the axle can be individually adjusted, for example with the aid of a plug-in system as shown in FIG. 1*a*. The detachable connection may also allow switching between different types of wheels, for example between smaller wheels for indoor use and larger wheels for rough terrain, for example outdoors. In some embodiments, illustrated in FIG. 1*b*, the wheels 160 may be each suspended in an axle fork, whose tilting can be variably adjusted and which may be each pivotably and possibly detachably connected to the wheel suspension 192 (cf. FIG. 1) via pivot joints 190 (cf. FIGS. 1 and 1*a*). The axle fork tilt can thus be adapted to the activity. For example, if the axle fork is perpendicular to the ground, this may increase the maneuverability of the walking device. Additionally, or alternatively, if the axle fork is tilted, the directional stability of the walking device may be increased. In the example embodiment shown, the wheels can be pivoted 360° around the rotational axis of the pivot joints 190—other angular ranges are of course also possible.

As shown in FIG. 3, the lower part of the connecting bar 194 may extend beyond the joint 230 and the wheel suspension 192 towards the ground. There, the lower part of the connecting bar 194 may be in contact with two spring elements 300 of the adjusting and/or limiting apparatus 240.

Figure 4:
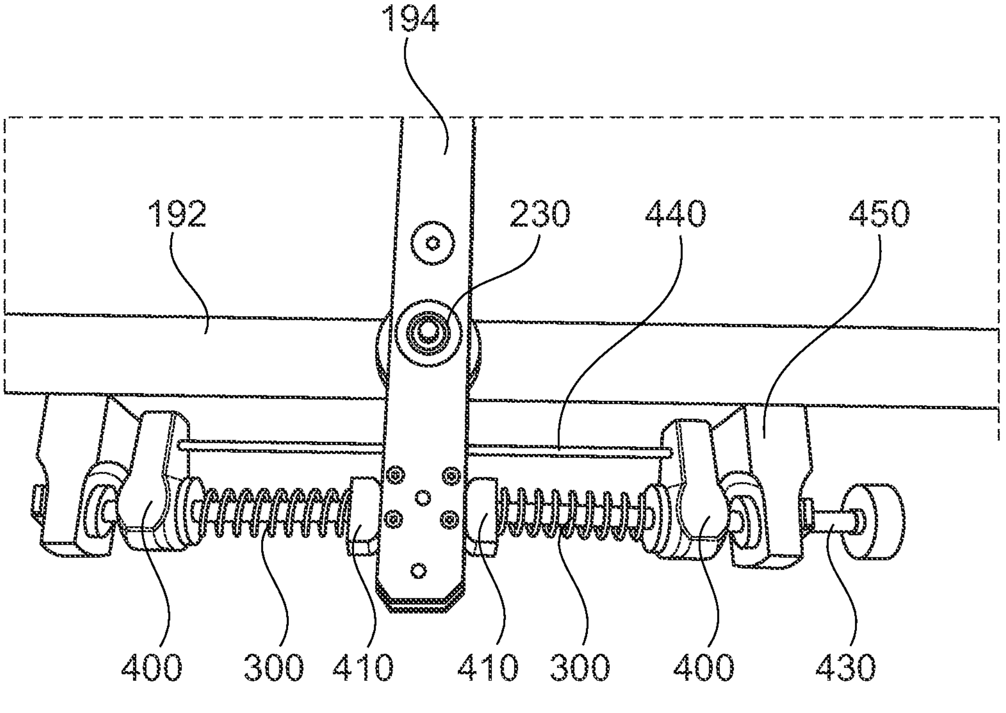
FIG. 4 illustrates a front view of an adjustment apparatus for tilting a rolling walking device, according to some embodiments.

FIG. 4 illustrates the functionality of the above-mentioned adjusting and limiting apparatus 240. It may be connected to the underside of the wheel suspension 192 via two fastening blocks 450, wherein one of the fastening blocks 450 may be arranged on the left and one on the right side of the joint 230 respectively. Between the fastening blocks 450 may extend a guide bar 440 and a rotatable threaded bar 430 with an external thread.

Additionally, two limiting blocks 400 may be provided on the threaded bar 430 and the guide bar 440 in such a manner that when the threaded bar 430 is rotated, the position of the limiting blocks 400 can be moved parallel to the wheel suspension 192 along the guide bar 440. For example, the limiting blocks 400 may comprise internal threads matching the external threads of the threaded bar 430 and can thus be moved along the guide bar 440 by rotating the threaded bar 430. The limiting blocks 400 may be connected via the spring elements 300 to two end blocks 410, which may be pressed against the right and left outer surfaces of the lower part of the connecting bar 194 by the spring elements 300.

If now the connecting bar 194 is deflected from the center position, in which the connecting bar 194 forms approximately a 900 angle with the wheel suspension 192, the spring elements 300 may generate a restoring force against the tilting of the connecting bar 194, the restoring force being transmitted from the spring elements 300 to the lower part of the connecting bar 194 via the end blocks 410. The restoring force generated by the spring elements may result in a restoring torque acting at the joint 230, the amount of which is essentially determined by the product of the spring restoring force and the lever length, i.e. the length of the lower part of the connecting bar 194 measured from the joint 230 to the point of contact of the respective end block 410. As long as the spring elements 300 are operated in a regime that satisfies Hook's law, the restoring force should be proportional to the deflection of the respective spring element 300 from its rest position. Thus, in such a regime, the restoring torque may also be proportional to the tilting angle of the connecting bar 194 from the center position.

In the shown embodiment, the distances between the limiting blocks 400 and the associated end blocks 410 can be adjusted independently of each other, which may allow the spring elements 300 to be preloaded independently of each other and thus provide an asymmetric restoring force against tilting of the connecting bar 194. Further, it may also be possible to use spring elements 300 with different spring constants to further adapt this asymmetry.

By a suitable choice of spring element 300 and the position of the associated limiting block 400, a fixed stop for the tilting of the connecting bar 194 can be realized on one or both sides. In this way, not only can the restoring torque be set by the adjusting and/or limiting apparatus 240, but also a maximum possible tilting can be specified. Like the restoring torque, this maximum tilting can also be set independently for both tilting directions. In the described embodiment, both the stop and the restoring spring force may be set by the position of the limiting blocks 400. However, embodiments are also conceivable in which the stop and the restoring spring force can be set separately from each other and limiting blocks 400 may be used for setting the stop.

Figure 5:
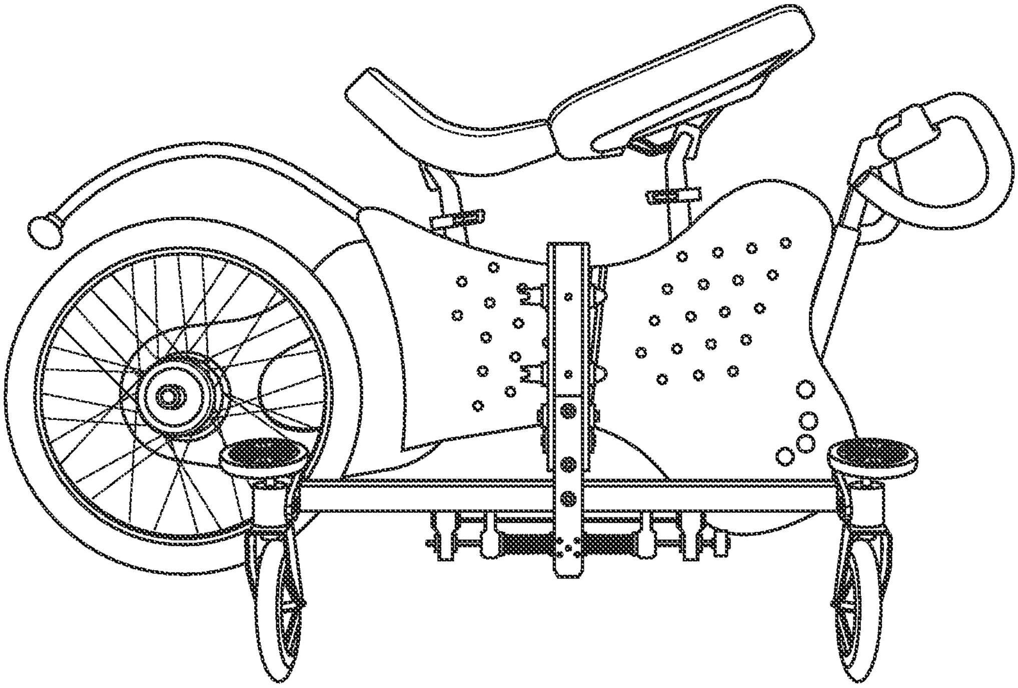
FIG. 5 illustrates a side view of a rolling walking device in a partially disassembled state, according to some embodiments.

FIG. 5 illustrates a side view of the walking device of FIG. 1 in a partially disassembled state. In particular, FIG. 5 illustrates that the connecting bar may be disassembled, since the wheel suspension with the front wheels can be arranged parallel to the frame. In this partially disassembled state, the walking device can already be transported much more space-saving and can be quickly reassembled after transport.

Figure 6:
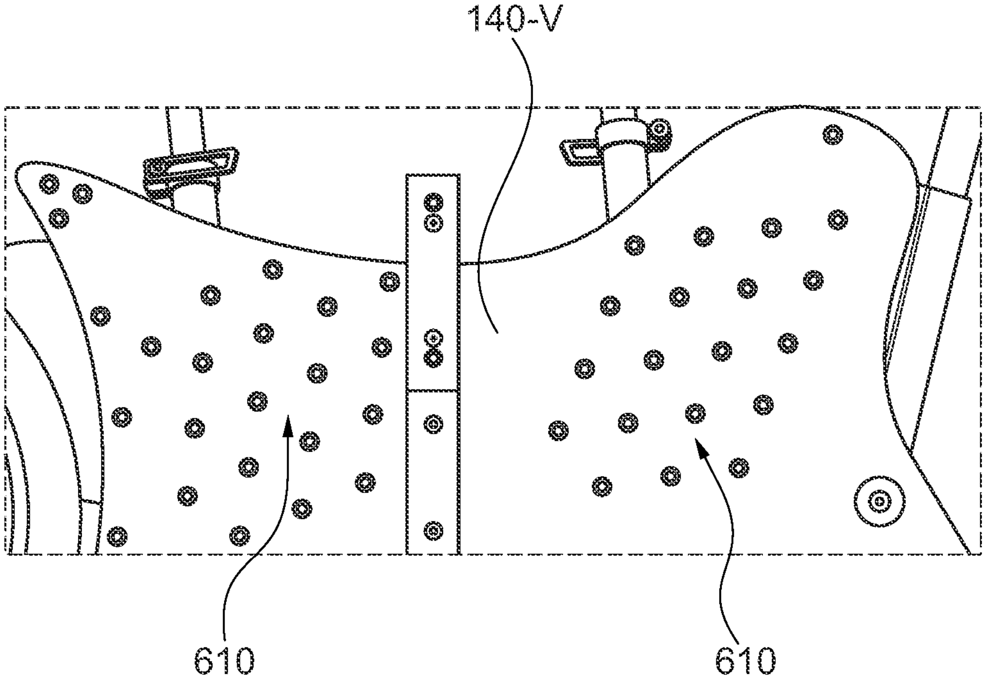
FIG. 6 illustrates a detailed view of a portion of the frame of a rolling walking device, according to some embodiments.

FIG. 6 illustrates a close-up view of the front portion 140-V of the frame of the walking device of FIG. 1. Shown in particular are two arrangements of fastening holes 610 defining possible fastening positions for the components of the walking device.

Figure 7:
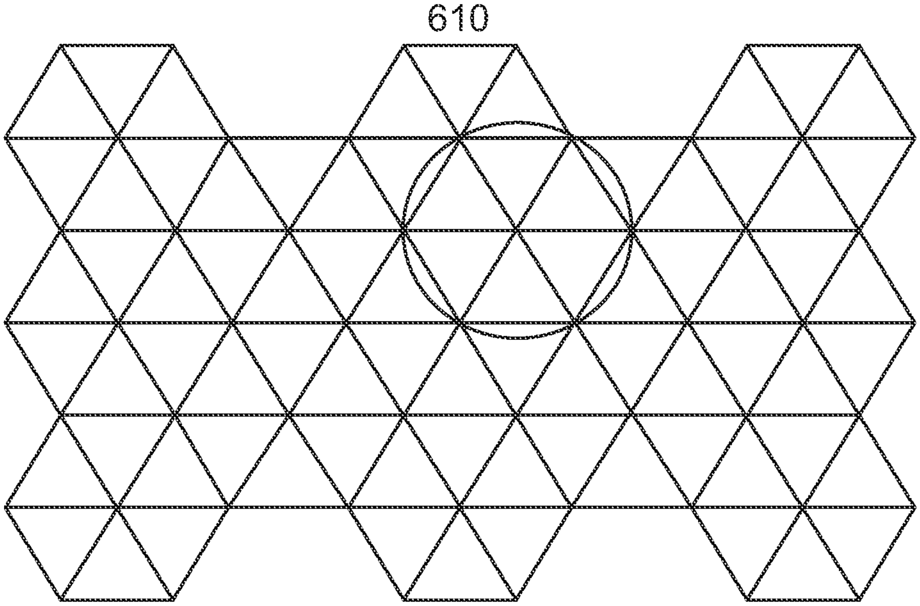
FIG. 7 illustrates a schematic illustration of the arrangement of fastening holes from FIG. 6, according to some embodiments.

FIG. 7 schematically illustrates the grid-like arrangement of the fastening holes 610 of FIG. 6. In particular, the fastening holes 610 may be arranged in a substantially triangular, equilateral triangular, or hexagonal grid, which allows the components of the walking device, such as the seat 100 and the upper body support 110, to be mounted to the frame 140 at different positions and at different angles.

As can be seen, for example, in FIG. 3, the front part 140-V of the frame may have respectively a left and a right fastening surface with corresponding arrangements 610 of fastening holes, such that the components of the walking device can be mounted between the two fastening surfaces, for example—as shown in FIG. 6—by screws or other quick-release fastening apparatuses.

Figure 8:
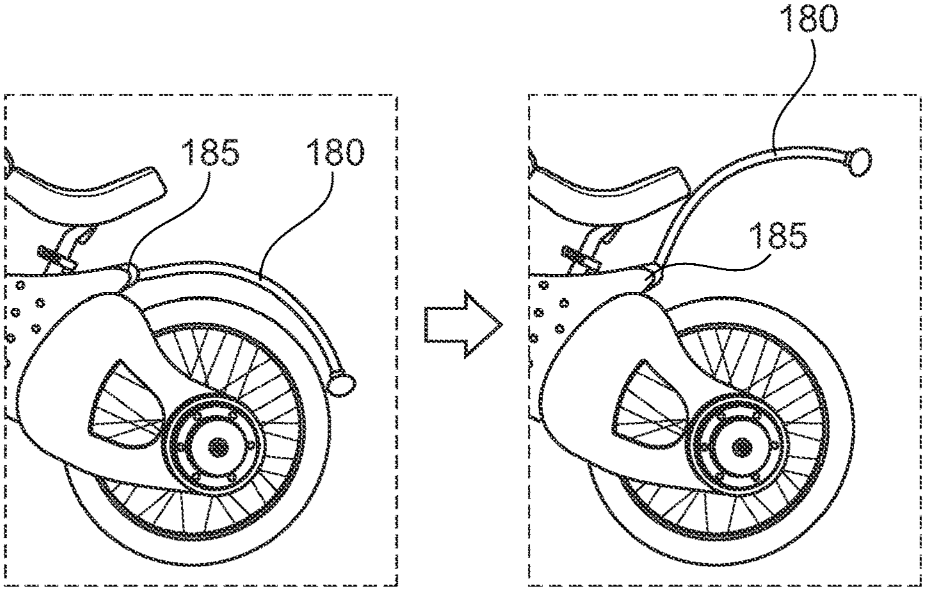
FIG. 8 illustrates two side views of the rear portion of a rolling walking device having a foldable push bar, according to some embodiments.

FIG. 8 illustrates a functionality of the foldable push bar 180 described above with reference to FIG. 1. In the folded state, the shape of the push bar 180 may follow the shape of the rear wheel of the walking device so as not to interfere with the patient entering the walking device and/or using the walking device. In the unfolded state, the push bar 180 may be used to assist the patient in using the walking device. The pivot joint 185, which connects the push bar 180 to the frame of the walking device, may thereby include a locking mechanism that allows the push bar 180 to be locked in the folded and/or unfolded state.

Figure 9:
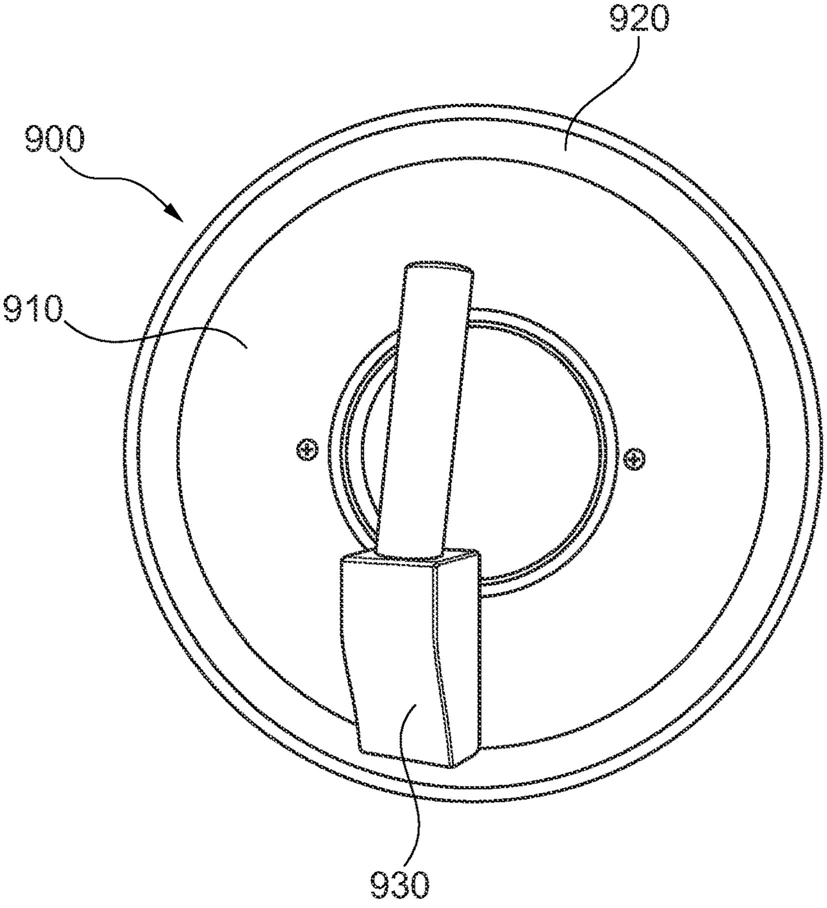
FIG. 9 illustrates a side view of the inside of a roller for a rolling walking device with a fastening apparatus located below the rotational axis of the roller, according to some embodiments.

FIG. 9 illustrates a novel wheel construction for a rolling walking device according to some embodiments of the present invention. In particular, FIG. 9 illustrates a side view of the inside of a wheel 900 with a fastening apparatus 930 arranged below the rotational axis of the wheel 900. Thereby, the fastening apparatus 930 may be fixedly connected to a disc-shaped element 910 of the wheel 900 so that the disc-shaped element 910 cannot rotate around the rotational axis of the wheel 900 when the fastening apparatus 930 is connected to a rolling walking device.

The wheel 900 may further comprise a tire-shaped element 920 which is rotatably connected to the non-rotating disk-shaped element 910. For example, the tire-shaped element 920 may be rotatably connected to the disc-shaped element 910 via a ball bearing and/or roller arrangement. The shown wheel construction thereby may allow laterally acting forces, which would be transmitted from the walking device via the fastener 930 to the wheel 900, to act on the lower end of the wheel 900 and thereby stabilize the wheel 900 against tilting and thus also the walking device against overturning.

In particular, this may allow the diameter of the wheel 900 to be increased without substantially shifting the point of application of the lateral forces upwards—which may not be the case, for example, with the front wheels 160 shown in FIG. 1, since in these the respective wheel is connected to the wheel suspension 192 of the walking device by the rotational axis. The wheel 900 shown in FIG. 9 thus may allow larger wheels to be used for rolling walking devices without making the walking device more susceptible to overturning. Larger wheels may therefore be advantageous because they improve the rolling characteristics of the walking device. For example, larger wheels may make it easier for the walking device to roll over obstacles such as doorsteps.

Figure 10:
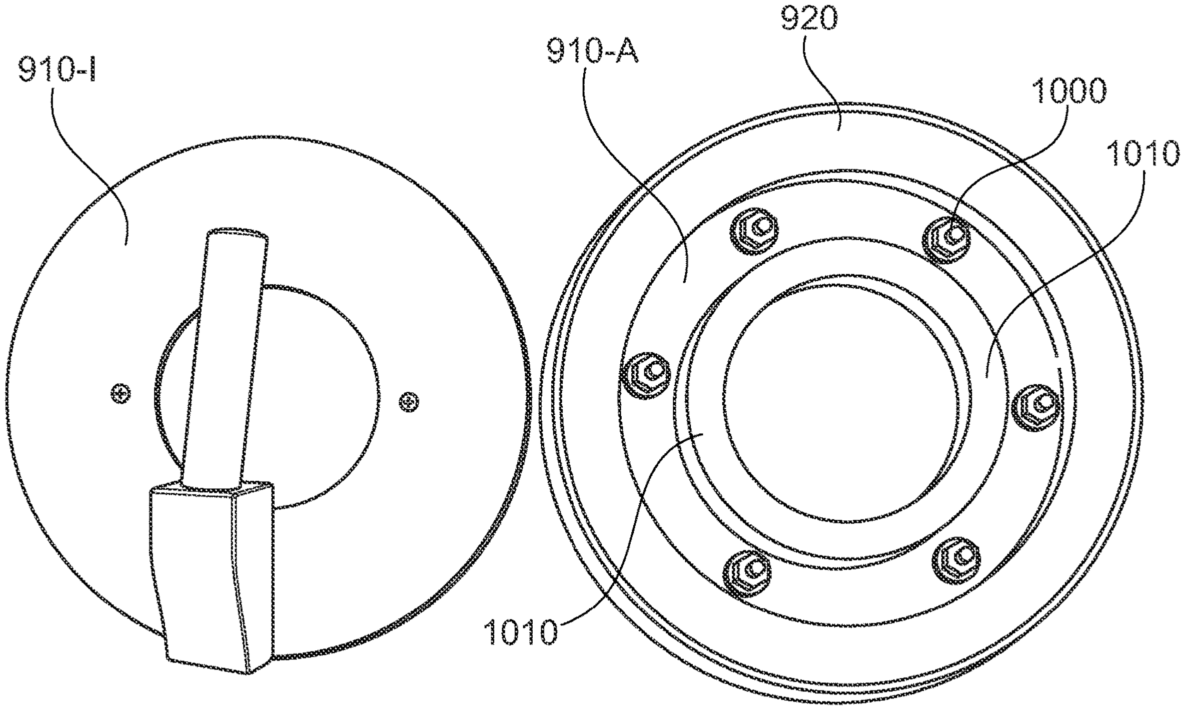
FIG. 10 illustrates a side view of the roller from FIG. 9 in a disassembled state, according to some embodiments.

FIG. 10 illustrates the wheel 900 of FIG. 9 in a partially disassembled state to illustrate how the tire-shaped element 920 is rotatably mounted to the disk-shaped element 910, according to some embodiments. In the embodiment shown, a plurality of small rollers 1000 may be disposed on the inner surface of the outer half 910-A of the disc-shaped element 910, and may be rotatably connected to the outer half 910-A. Here, the centers of the rollers 1000 may be all arranged at the same distance from the rotational axis of the wheel 900, i. e., from the center of the disk-shaped element 910. The tire-shaped element 920 may now rest with its inner surface on the outer surfaces of the plurality of rollers 1000, and can thus be rotated relative to the outer half 910-A of the disk-shaped element 910.

In the assembled state, the outer half 910-A of the disc-shaped element 910 may be fixedly connected to the inner half 910-I via two screws and screw holes 1010. Therefore, the disc-shaped element 910 may be fixedly and non-rotatably connected to the walking device via the fastening apparatus 930, while the tire-shaped element 920 may be rotatably supported by the rotatable rollers 1000.

FIG. 11*a* illustrates an embodiment of the invention in which the brake 132 may be in the form of a hand brake. The brake 132 can be for example, as shown in FIG. 11*a*, attached to the hand support 130 or also to the frame 140. The flexible traction element 134 may be designed as a rubber cord or textile. A net may also serve as flexible traction element. In some embodiments, the flexible traction element 134 may be tensioned, for example by being fastened in a clamping block 136, as shown in FIG. 11*a*. The clamping block may be in the form of a curry clamp. However, other fastening possibilities, which may be preferably equally releasable, are also conceivable, for example by hook or Velcro fastener. In some embodiments, the fastener may be located on the hand support 130, as shown in FIG. 11*a*.

If the traction element is fastened under appropriate tension, a uniform application of force to the brake 132 may result, such that the brake 132 may act as a grinding brake or also as a parking brake. In addition, such an arrangement may allow the brake 132 to also be applied by pressing on and/or pulling on the flexible traction element 134, as the application of force is in turn transmitted to the brake. This is illustrated in FIG. 11*b*. This may provide an alternative way of operating the brake 132 with one hand that requires less coordinated movement on behalf of the user, which could be particularly advantageous for patients with insufficient fist grip and/or insufficient finger mobility. In particular, the flexible traction element may also be designed as a flat textile or net to further simplify the operation of the brake.

The invention claimed is:

1. A rolling walking device for a person with a disability comprising:
- a planar frame element; and
- a plurality of rollers arranged on the planar frame element;
- wherein the planar frame element provides a plurality of adjustable positions for each of a plurality of components of the rolling walking device to be fastened to the planar frame element, wherein the plurality of components comprises at least one support apparatus wherein the planar frame element comprises a plurality of holes which define the plurality of adjustable positions, wherein at least a portion of the plurality of holes is arranged in a grid configuration that is substantially triangular, equilateral triangular, or hexagonal, and
- wherein the at least one support apparatus is configured such that the person can sit on the at least one support apparatus while using the rolling walking device and simultaneously rest with a front side of their upper body at least partially on the at least one support apparatus with their hip joint flexed.

2. The rolling walking device of claim 1,
- wherein the planar frame element is connected to at least one roller of the plurality of rollers via a fastener, and
- wherein the fastener is pivotally connected to the planar frame element.

3. The rolling walking device of claim 2, wherein the fastener of the at least one roller has a disk-shaped element that does not rotate about the rotational axis of the at least one roller and on which a tire-shaped element of the at least one roller is rotatably mounted.

4. The rolling walking device of claim 1, wherein the components of the walking device are removably fastened to the planar frame element.

5. The rolling walking device of claim 1, wherein the planar frame element comprises two fastening surfaces between which the components of the walking device are each adjustably attachable.

6. The rolling walking device of claim 1, wherein the walking device further has an adjustable push bar which is configured to be moved from a first position in which it follows the contour of a roller of the walking device to a second position for pushing the walking device.

7. The rolling walking device according to claim 1, wherein the walking device further has a brake at which a flexible traction element is configured such that the brake can be actuated by the person by an actuation of the flexible traction element.

8. A rolling walking device for a person with a disability comprising:
- a planar frame element; and
- a plurality of rollers arranged on the planar frame element, wherein the planar frame element is connected to at least one roller of the plurality of rollers via a fastener, and wherein the fastener is pivotally connected to the planar frame element;
- wherein the planar frame element provides a plurality of adjustable positions for each of a plurality of components of the rolling walking device to be fastened to the planar frame element, wherein the plurality of components comprises at least one support apparatus, and
- wherein the at least one support apparatus is configured such that the person can sit on the at least one support apparatus while using the rolling walking device and simultaneously rest with a front side of their upper body at least partially on the at least one support apparatus with their hip joint flexed.

9. The rolling walking device of claim 8, wherein the fastener of the at least one roller has a disk-shaped element that does not rotate about the rotational axis of the at least one roller and on which a tire-shaped element of the at least one roller is rotatably mounted.

10. The rolling walking device of claim 8, wherein the components of the walking device are removably fastened to the planar frame element.

11. The rolling walking device of claim 8, wherein the planar frame element comprises two fastening surfaces between which the components of the walking device are each adjustably attachable.

12. The rolling walking device of claim 8, wherein the walking device further has an adjustable push bar which is configured to be moved from a first position in which it follows the contour of a second roller of the plurality of rollers to a second position for pushing the walking device.

13. The rolling walking device according to claim 8, wherein the walking device further has a brake at which a flexible traction element is configured such that the brake can be actuated by the person by an actuation of the flexible traction element.

14. A rolling walking device for a person with a disability comprising:
- a planar frame element;
- a plurality of rollers arranged on the planar frame element; and
- an adjustable push bar which is configured to be moved from a first position in which it follows a contour of a roller of the walking device to a second position for pushing the walking device,
- wherein the planar frame element provides a plurality of adjustable positions for each of a plurality of components of the rolling walking device to be fastened to the planar frame element, wherein the plurality of components comprises at least one support apparatus, and
- wherein the at least one support apparatus is configured such that the person can sit on the at least one support apparatus while using the rolling walking device and simultaneously rest with a front side of their upper body at least partially on the at least one support apparatus with their hip joint flexed.

15. The rolling walking device of claim 14, wherein the components of the walking device are removably fastened to the planar frame element.

16. The rolling walking device of claim 14, wherein the planar frame element comprises two fastening surfaces between which the components of the walking device are each adjustably attachable.

17. The rolling walking device according to claim 14, wherein the walking device further has a brake at which a flexible traction element is configured such that the brake can be actuated by the person by an actuation of the flexible traction element.

* * * * *